(12) United States Patent
Lim et al.

(10) Patent No.: US 12,248,702 B2
(45) Date of Patent: Mar. 11, 2025

(54) MEMORY CONTROLLER INCLUDING MEMORY MANAGER FOR MAPPING BUFFER IDENTIFIER TO SEGMENT

(71) Applicant: SK hynix Inc., Icheon-si (KR)

(72) Inventors: Tae Ho Lim, Icheon-si (KR); Ie Ryung Park, Icheon-si (KR); Dong Sop Lee, Icheon-si (KR); Youn Won Park, Icheon-si (KR); Jae Min Jang, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 50 days.

(21) Appl. No.: 18/151,429

(22) Filed: Jan. 7, 2023

(65) Prior Publication Data

US 2024/0069796 A1 Feb. 29, 2024

(30) Foreign Application Priority Data

Aug. 29, 2022 (KR) .......................... 10-2022-0108334

(51) Int. Cl.
*G06F 3/06* (2006.01)
(52) U.S. Cl.
CPC .......... *G06F 3/0656* (2013.01); *G06F 3/0604* (2013.01); *G06F 3/0673* (2013.01)
(58) Field of Classification Search
CPC ..... G06F 3/0656; G06F 3/0673; G06F 3/0604
See application file for complete search history.

(56) References Cited

U.S. PATENT DOCUMENTS

| 8,006,032 | B2 * | 8/2011 | Askar | G06F 13/1684 |
| | | | | 711/111 |
| 9,286,245 | B2 | 3/2016 | Durham et al. | |
| 10,515,017 | B2 | 12/2019 | Zaykov et al. | |
| 2009/0161684 | A1 * | 6/2009 | Voruganti | H04L 49/9078 |
| | | | | 370/412 |
| 2023/0168838 | A1 * | 6/2023 | Moon | G06F 12/0246 |
| | | | | 711/154 |

FOREIGN PATENT DOCUMENTS

| KR | 101699770 B1 | 3/2012 |
| KR | 1020140027518 A | 3/2014 |
| KR | 1020150127434 A | 11/2015 |
| KR | 101944876 B1 | 6/2016 |
| KR | 1020210106929 A | 8/2021 |

* cited by examiner

*Primary Examiner* — Mark A Giardino, Jr.

(57) ABSTRACT

A memory controller includes a plurality of processors, a memory device and a memory manager. The memory device includes a plurality of segments, which are divided into a plurality of segment groups, to which group identifiers are respectively assigned. The memory manager is configured to map a first buffer identifier to a first group identifier from among the group identifiers, select one or more segments only from a first segment group, to which the first group identifier is assigned among the plurality of segment groups, map the first buffer identifier to the one or more segments, and allocate, to a first processor from among the plurality of processors, the first buffer identifier and the one or more segments.

20 Claims, 10 Drawing Sheets

MEMORY CONTROLLER INCLUDING MEMORY MANAGER FOR MAPPING BUFFER IDENTIFIER TO SEGMENT

CROSS-REFERENCES TO RELATED APPLICATION

The present application claims priority under 35 U.S.C. § 119(a) to Korean application number 10-2022-0108334, filed on Aug. 29, 2022, in the Korean Intellectual Property Office, which is incorporated herein by reference in its entirety.

BACKGROUND

1. Technical Field

Various embodiments are related to a memory controller and, more particularly, a memory controller of a memory system.

2. Related Art

A memory system may be configured to store data provided from an external device in response to a write request from the external device. Furthermore, the memory system may be configured to provide stored data to the external device in response to a read request from the external device. The external device may be an electronic device capable of processing data and may be a host device such as a computer, a digital camera, a mobile phone and so forth. The memory system may be mounted in the host device or may be fabricated to be capable of being connected to and detached from the host device.

The memory system may include a storage medium and a memory controller. The storage medium may be configured to permanently store data therein. The memory controller may be configured to control the storage medium. The memory controller may include a processor configured to perform an operation in response to a request from the host device, a memory device configured to operate as a buffer, a cache and so forth, and a memory manager configured to control the memory device. In response to an allocation request from the processor, the memory manager may be configured to allocate segments to the processor, where the segments are included in the memory device. In order to access the allocated segments, the processor may be configured to provide an access request to the memory manager.

SUMMARY

In an embodiment, a memory controller may include a plurality of processors, a memory device and a memory manager. The memory device may include a plurality of segments, which are divided into a plurality of segment groups, to which group identifiers are respectively assigned. The memory manager may be configured to map a first buffer identifier to a first group identifier from among the group identifiers, select one or more segments only from a first segment group, to which the first group identifier is assigned among the plurality of segment groups, map the first buffer identifier to the one or more segments, and allocate, to a first processor from among the plurality of processors, the first buffer identifier and the one or more segments.

In an embodiment, a memory controller may include a memory device and a memory manager. The memory device may include segments, which are divided into regions. The memory manager may include sub-selecting units configured to select, in parallel, from the respective regions, segments to be mapped to a buffer identifier.

In an embodiment, a memory controller may include a plurality of processors, a memory device and a memory manager. The memory device may include a plurality of segments, to which segment indexes are respectively assigned. The memory manager may be configured to re-arrange segments, to which one or more buffer identifiers are mapped, map a virtual buffer identifier to the re-arranged segments, assign continuous virtual slot indexes to the re-arranged segments, and allocate the virtual buffer identifier to a first processor among the plurality of processors. The first processor may be configured to access the re-arranged segments based on the virtual buffer identifier and the virtual slot indexes.

DETAILED DESCRIPTION

Exemplary embodiments of the present disclosure will be described below in more detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art.

The drawings are not necessarily to scale and, in some instances, proportions may have been exaggerated in order to clearly illustrate features of the embodiments. The terminology used herein is for the purpose of describing particular embodiments only and is not intended to be limiting of the disclosure.

As used herein, the term "and/or" includes at least one of the associated listed items. It will be understood that when an element is referred to as being "connected to", or "coupled to" another element, it may be directly connected to, or directly coupled to, the other element, or one or more intervening elements may be present. As used herein, singular forms are intended to include the plural forms and vice versa, unless the context clearly indicates otherwise. It will be further understood that the terms "comprises," "comprising," "includes," and "including" when used in this specification, specify the presence of the stated elements and do not preclude the presence or addition of one or more other elements.

Hereinafter, exemplary embodiments of the present disclosure will be described below with reference to the accompanying drawings.

In accordance with an embodiment, provided may be a memory controller capable of effectively performing dynamic memory allocation and release.

Figure 1:
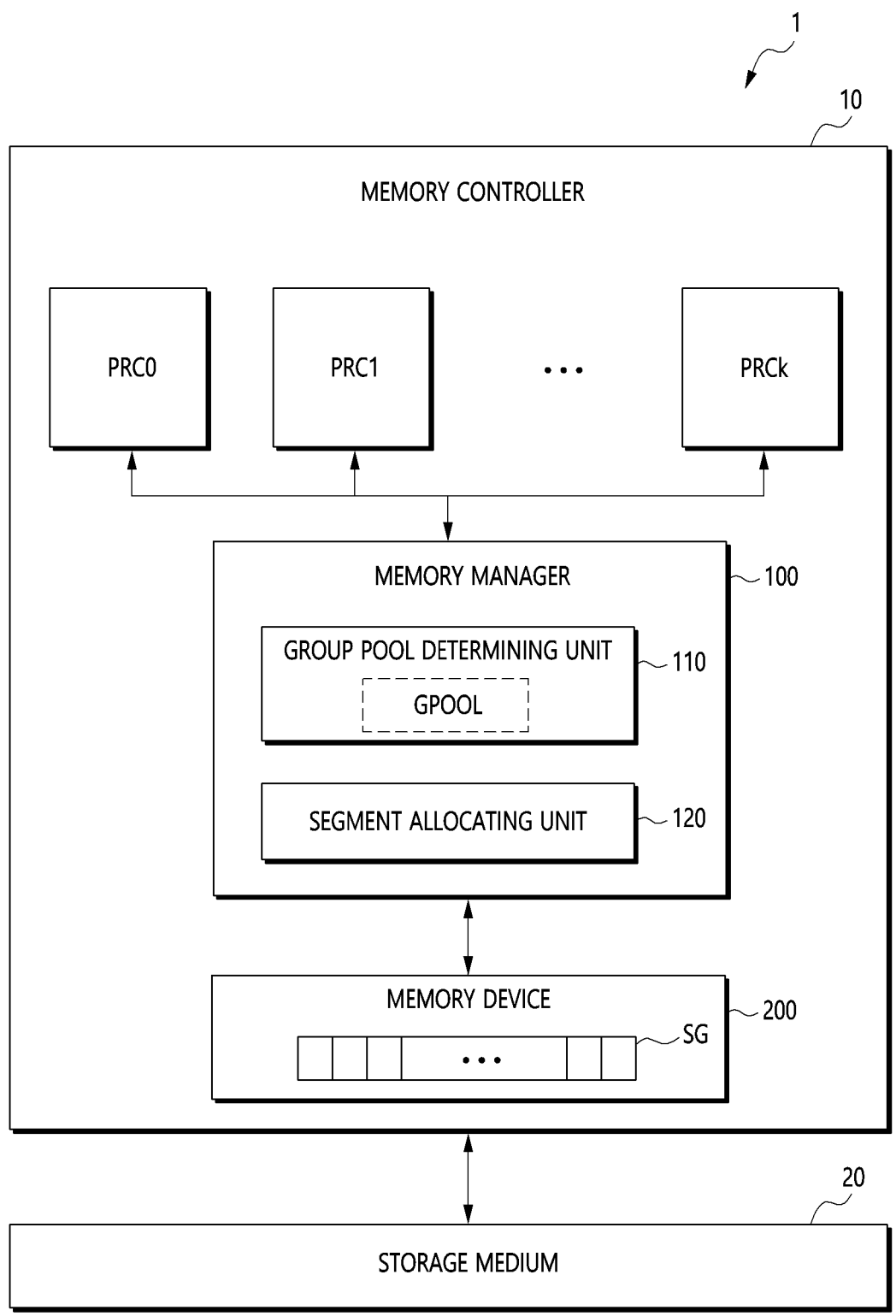
FIG. 1 is a block diagram illustrating a memory system including a memory controller in accordance with an embodiment of the disclosure.

FIG. 1 is a block diagram illustrating a memory system including a memory controller in accordance with an embodiment of the disclosure.

Referring to FIG. 1, a memory system 1 may be configured to store data provided from an external device in response to a write request from the external device. Furthermore, the memory system 1 may be configured to provide stored data to the external device in response to a read request from the external device. The external device may include a host device configured to control the memory system 1. The external device may be an electronic device capable of processing data and may include a computer, a digital camera, a mobile phone and so forth.

The memory system 1 may include a personal computer memory card international association (PCMCIA) card, a compact flash (CF) card, a smart media card, a memory stick, various multimedia cards (e.g., MMC, eMMC, RS-MMC, and MMC-micro), secure digital (SD) cards (e.g., SD, Mini-SD and Micro-SD), a universal flash storage (UFS) or a solid-state drive (SSD).

The memory system 1 may include a memory controller 10 and a storage medium 20.

The memory controller 10 may control overall operations of the memory system 1. The memory controller 10 may control the storage medium 20 in order to perform a foreground operation in response to a request from an external device. The foreground operation may include an operation of writing data into the storage medium 20 in response to a write request from the external device and an operation of reading data from the storage medium 20 in response to a read request from the external device.

In order to perform a background operation, which may be internally required, the memory controller 10 may control the storage medium 20 independently of the external device. For example, a background operation may include one or more of wear-levelling operation, garbage collection operation, erase operation, a read-reclaim operation and a refresh operation on the storage medium 20. A background operation may also include operations of writing data into the storage medium 20 and reading data from the storage medium 20, like foreground operations.

The memory controller 10 may include one or more processors PRC0 to PRCk, a memory manager 100 and a memory device 200. Each of the processors PRC0 to PRCk and the memory manager 100 may be embodied by hardware, software or a combination of hardware and software.

The processors PRC0 to PRCk may access the memory device 200 through the memory manager 100 to perform various operations. In order to utilize the memory device 200, the processors PRC0 to PRCk may provide a memory allocation request to the memory manager 100. Each of the processors PRC0 to PRCk may receive a buffer identifier in response to the memory allocation request. Based on the buffer identifier, each of the processors PRC0 to PRCk may provide the memory manager 100 with an access request for accessing one or more segments within the memory device 200. Each of the processors PRC0 to PRCk may include a central processing unit, a graphic processing unit, a microprocessor, an application processor, an accelerated processing unit, an operating system and so forth.

In response to the memory allocation request from the processors PRC0 to PRCk, the memory manager 100 may perform dynamic allocation and release on the memory device 200. In response to an access request from the processors PRC0 to PRCk, the memory manager 100 may provide the memory device 200 with a command for accessing a specific segment.

The memory manager 100 may manage group identifiers. Segments SG included in the memory device 200 may be grouped into a plurality of segment groups. Respective group identifiers may be assigned to the plurality of segment groups. Each segment group may be configured by segments of continuous segment indexes.

The memory manager 100 may map a first buffer identifier to a first group identifier among the group identifiers, may map the first buffer identifier to one or more of the segments, and may allocate the first buffer identifier and the one or more segments to a first processor among the processors PRC0 to PRCk. When the first buffer identifier is mapped to the first group identifier, the memory manager 100 may select the one or more segments, from a first segment group assigned to the first group identifier, which are to be mapped to the first buffer identifier. When the first buffer identifier is mapped to the first group identifier, the memory manager 100 does not select segments from any segment group other than the first segment group to be mapped to the first buffer identifier. The memory manager 100 may manage maximum allocation counts respectively corresponding to the group identifiers and may select, within a limit of the maximum allocation count corresponding to the first group identifier, the one or more segments to be mapped to the first buffer identifier.

The memory manager 100 may include a group pool determining unit 110 and a segment allocating unit 120. The group pool determining unit 110 and the segment allocating unit 120 may select the one or more segments to be mapped to the first buffer identifier from the first segment group, to which the first group identifier is assigned.

Specifically, the group pool determining unit 110 may generate group pool information GPOOL indicating segments that can be mapped to the first buffer identifier and segments that are unmappable to the first buffer identifier. The group pool determining unit 110 may determine segments, which are free and included in the first segment group, as the segments mappable to the first buffer identifier.

The segment allocating unit 120 may select, in parallel, the one or more segments to be mapped to the first buffer identifier based on respective group pool information that is internally organized or divided within the group pool information GPOOL.

In an embodiment, the memory manager 100 may assign continuous slot indexes to the one or more segments to be mapped to the first buffer identifier. The memory manager 100 may manage a table assigned to the first buffer identifier. The table assigned to the first buffer identifier may include a segment index mapped to each of the continuous slot indexes. By utilizing the first buffer identifier and the continuous slot indexes, the first processor may access the one or more segments. Specifically, the first processor may provide an access request to the memory manager 100, the access request including the first buffer identifier and the slot index. In response to the access request, the memory manager 100 may refer to the table assigned to the first buffer identifier to identify the segment index mapped to the provided slot index and may access the segment, to which the identified segment index is assigned.

In an embodiment, the memory manager 100 may re-arrange segments that are mapped to one or more buffer identifiers, may assign continuous virtual slot indexes to the re-arranged segments, may map a virtual buffer identifier to the re-arranged segments and may allocate the virtual buffer identifier to the first processor. The memory manager 100 may manage a table assigned to a virtual buffer identifier, the table including the buffer identifier and the slot index, both of which are mapped to each of continuous virtual slot indexes. By utilizing the virtual buffer identifier and the virtual slot indexes, the first processor may access the segments mapped to the one or more buffer identifiers. Specifically, the first processor may provide an access request to the memory manager 100, the access request including the virtual buffer identifier and the virtual slot index. In response to the access request, the memory manager 100 may refer to the table assigned to the virtual buffer identifier to identify the buffer identifier and the slot index both mapped to the provided virtual slot index, may refer to the table assigned to the identified buffer identifier to identify the segment index mapped to the identified slot index and may access the segment, to which the identified segment index is assigned.

The memory device 200 may include the plurality of segments SG. In response to an access command from the memory manager 100, the memory device 200 may access a specific segment. The memory device 200 may operate as one or more of an operating memory, a buffer memory, a cache memory and so forth. As an operating memory, the memory device 200 may store therein software program and various program data, which are run by the processors PRC0 to PRCk. As a buffer memory, the memory device 200 may buffer data that is transferred between the storage medium 20 and the external device. As a cache memory, the memory device 200 may temporarily store cache data.

The memory device 200 may include a volatile memory device and/or a non-volatile memory device. The volatile memory device may include one or more of a dynamic random-access memory (DRAM), a static RAM (SRAM) and so forth. The non-volatile memory device may include one or more of a flash memory device such as a NAND flash or a NOR flash, a ferroelectric RAM (FRAM), a phase-change RAM (PCRAM), a magnetic RAM (MRAM), a resistive RAM (ReRAM) and so forth.

Under the control of the memory controller 10, the storage medium 20 may store data provided from the memory controller 10 and may provide read data to the memory controller 10. The storage medium 20 may include one or more non-volatile memory devices.

Figure 2:
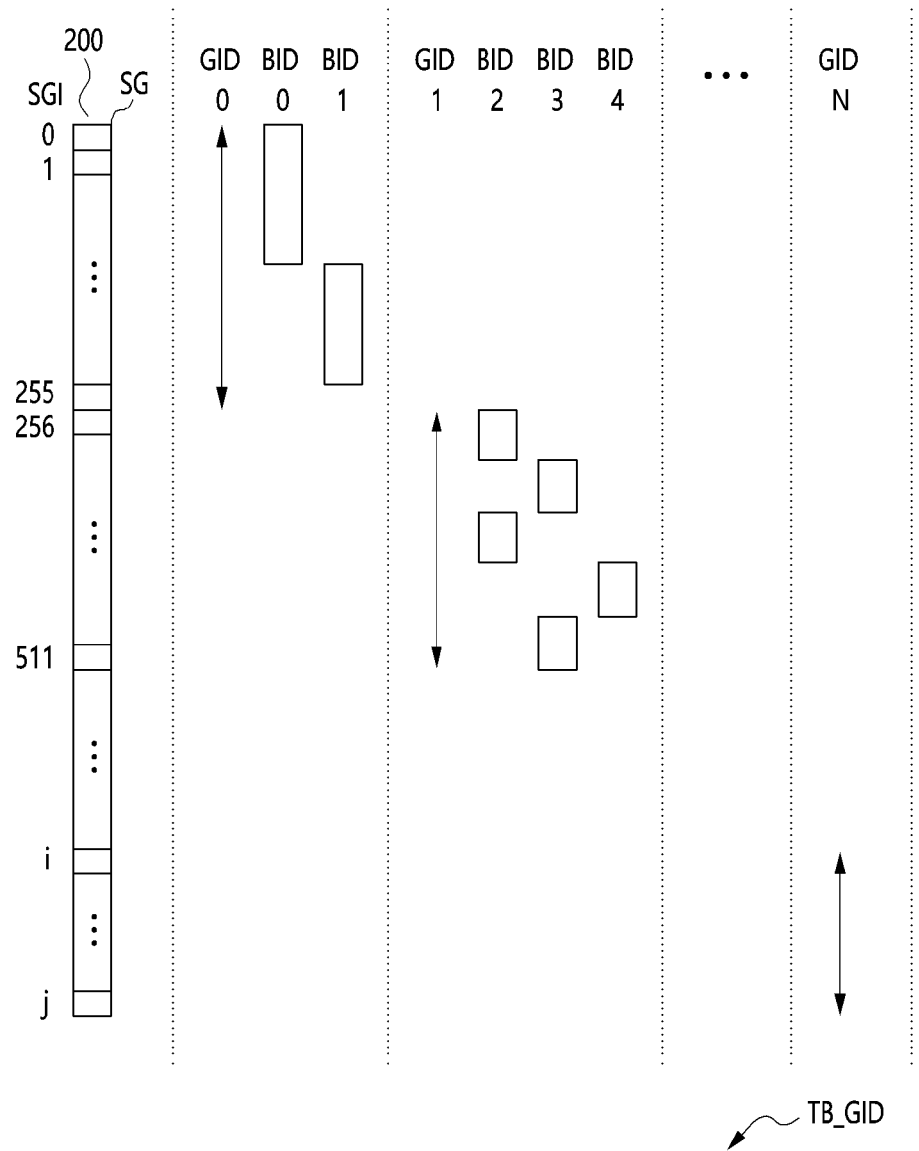
FIG. 2 is a diagram illustrating a buffer identifier and a group identifier in accordance with an embodiment of the disclosure.

FIG. 2 is a diagram illustrating a buffer identifier and a group identifier in accordance with an embodiment of the disclosure.

Referring to FIG. 2, a memory device 200 may include segments SG, to which a continuous sequence from a segment index SGI 0 to a segment index SGI j are respectively assigned. A segment may be a unit of storage region that is allocated within the memory device 200. A segment index SGI may represent a sequence of the segments SG. The segment index SGI may be a physical address for identifying each of the segments SG. The segments SG may be grouped into one or more segment groups, to which one or more group identifiers GID are respectively assigned. The group identifiers GID will be described in detail later.

The group identifier GID may be an identifier assigned to each segment group. In other words, the group identifier GID may be an identifier assigned to segments configuring each segment group. For example, the group identifier GID 0 may be assigned to a segment group configured by segments corresponding to a segment index SGI 0 to a segment index SGI 255. The group identifier GID 1 may be assigned to a segment group configured by segments corresponding to a segment index SGI 256 to a segment index SGI 511. Each segment group may be configured by segments corresponding to the continuous segment indexes SGI. In other embodiments, numbering of segments, to which the group identifier GID 0 and the group identifier GID 1 are assigned, may be different than illustrated in FIG. 2.

In an embodiment, segment groups may overlap each other. In other words, some segments may be commonly shared by two or more segment groups.

In an embodiment, a segment group may be configured by discontinuous segments.

Referring again to FIG. 2, the memory manager 100 may manage information of the group identifier GID through a table TB_GID. The memory manager 100 may update the table TB_GID in real time. For each group identifier GID, the memory manager 100 may manage a start segment index SSGI, an end segment index ESGI, a maximum allocation count MC and a current allocation count CC.

The start segment index SSGI may be a segment index SGI assigned to a forwardmost segment from among continuous segments, to which the corresponding group identifier GID is assigned. The end segment index ESGI may be a segment index SGI assigned to a last segment from among the continuous segments, to which the corresponding group identifier GID is assigned.

The maximum allocation count MC may be a maximum number of segments to which a corresponding group identifier GID can be assigned. The maximum allocation count MC may have a lower value than a total number of segments, to which the corresponding group identifier GID is assigned. For example, the maximum allocation count MC may be less than the difference between the start segment index SSGI and the end segment index ESGI of the corresponding group identifier GID. Furthermore, the maximum allocation count MC may have a lower value than a predetermined maximum value.

The current allocation count CC may be a number of segments, currently allocated to the processors PRC0 to PRCk, to which the corresponding group identifier GID is assigned. The memory manager 100 may allocate segments to the processors PRC0 to PRCk such that the current allocation count CC of the corresponding group identifier GID does not become greater than the maximum allocation count MC for the corresponding group identifier GID.

In an embodiment, the memory manager 100 may adjust a number of the group identifiers GID, a total number of segments to which each group identifier GID is assigned, and the maximum allocation count MC corresponding to each group identifier GID. In an embodiment, the memory system 1 may have the number of the group identifiers GID, the total number of segments to which each group identifier GID is assigned, and the maximum allocation count MC corresponding to each group identifier GID fixed during the manufacturing process.

A buffer identifier BID may be an identifier assigned to each of the processors PRC0 to PRCk. One of the processors PRC0 to PRCk may provide the memory manager 100 with a memory allocation request for utilizing the memory device 200. The buffer identifier BID may be assigned to the processor and one or more segments may be allocated to the processor. In an embodiment, the memory allocation request may include a buffer identifier assignment request and a segment allocation request. In an embodiment, the processor may provide the buffer identifier assignment request to get a buffer identifier assigned and may provide, based on the assigned buffer identifier, the segment allocation request to get one or more segments allocated. When ending the utilization of the allocated segments, the processor may provide the memory manager 100 with a memory release request for releasing the allocated segments. The released segments may become free and may be mapped to another buffer identifier BID to be allocated to another processor. When ending the utilization of the memory device 200, the processor may provide the memory manager 100 with a buffer identifier release request. The released buffer identifier BID may be assigned to another processor requesting the assignment of a buffer identifier BID. In an embodiment, when the processor ends the utilization of all of the allocated segments, the memory manager 100 may release the buffer identifier BID assigned to the processor even without a buffer identifier release request from the processor.

In an embodiment, each buffer identifier may be generated in units corresponding to processors. In an embodiment, a plurality of buffer identifiers may be assigned to a single processor. In an embodiment, a single buffer identifier may be commonly assigned to a plurality of processors.

The memory manager 100 may map the group identifier GID and the buffer identifier BID to each other. The table TB_GID may further include mapping information of the group identifier GID and the buffer identifier BID. Each group identifier GID may be mapped to one or more buffer identifiers BID that are different from each other. Each buffer identifier BID may be mapped to a single group identifier GID. For example, the group identifier GID 0 may be mapped to the buffer identifier BID 0 and the buffer identifier BID 1 and the group identifier GID 1 may be mapped to the buffer identifiers BID 2, 3 and 4.

The mapping relationship between the buffer identifier BID and the group identifier GID may not be fixed. For example, when the buffer identifier BID 0 mapped to the group identifier GID 0 is assignment-released, the buffer identifier BID 0 may be mapped to the group identifier GID 1 in a new assignment. When an allocation-requested number of segments is less than the difference between the maximum allocation count MC and the current allocation count CC both corresponding to a group identifier GID, the memory manager 100 may map, to the corresponding group identifier GID, the buffer identifier BID that is to be assigned to a processor requesting the allocation of segments. However, in an embodiment, the mapping relationship between the buffer identifier BID and the group identifier GID may be fixed during the fabrication stage of the memory system 1 and may be unchangeable.

As illustrated, the buffer identifier BID may be sequentially mapped to the group identifier GID in an ascending order of the group identifier GID. However, in other embodiments, the buffer identifier BID may be non-sequentially mapped to the group identifier GID regardless of the order of the group identifier GID. For example, the buffer identifier BID 0 may be mapped to the group identifier GID N.

The memory manager 100 may map, to a specific buffer identifier BID, only segments corresponding to a group identifier GID that is mapped to the specific buffer identifier BID. While the specific buffer identifier BID is mapped to the group identifier GID, the memory manager 100 may not map, to the specific buffer identifier BID, segments corresponding to another group identifier GID that is not mapped to the specific buffer identifier BID. For example, referring to the table TB_GID, the buffer identifier BID 2 is mapped to the group identifier GID 1 and therefore the memory manager 100 may map, to the buffer identifier BID 2, segments corresponding to the group identifier GID 1. The table TB_GID may further include segment mapping information AI representing information about the segment mapped to each buffer identifier BID. The segment mapping information AI may include information of the segment indexes SGI, a number and utilization statuses of the segments mapped to each buffer identifier BID.

When segments within the single memory device 200 are repeatedly allocated to and released from the plurality of processors, high utilization of the memory is advantageous but if memory monopoly for only a part of the processors occurs, then the performance of the memory system 1 may become degraded. In accordance with an embodiment, eventually only segments corresponding to a single group identifier GID may be allocated to each processor and therefore the maximum memory occupancy within the memory device 200 may be set for each processor, and minimum memory occupancy within the memory device 200 may also guaranteed for each processor. Accordingly, memory starvation and performance degradation of the memory system 1 may be prevented while the high utilization of memory is kept.

Hereinafter, the group pool determining unit 110 and the segment allocating unit 120 configured to select, based on the group identifier GID, segments to be mapped to the buffer identifier BID will be described in detail with reference to FIGS. 3 to 5.

Figure 3:
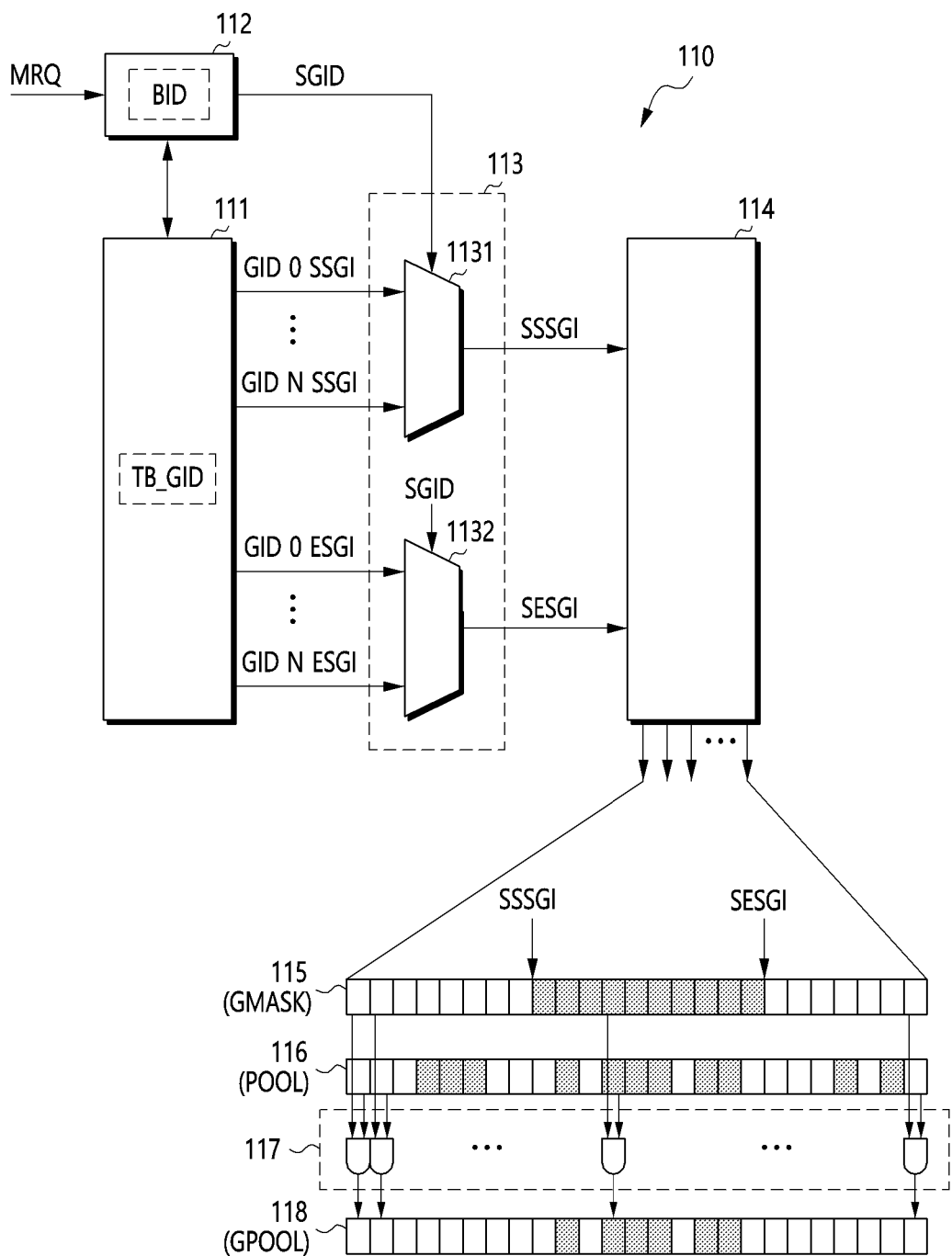
FIG. 3 is a diagram illustrating a group pool determining unit in accordance with an embodiment of the disclosure.

FIG. 3 is a diagram illustrating a group pool determining unit in accordance with an embodiment of the disclosure.

Referring to FIG. 3, the group pool determining unit 110 may generate, in response to the memory allocation request MRQ provided from the processor, group pool information GPOOL indicating segments mappable to the buffer identifier, and segments unmappable to the buffer identifier.

The group pool determining unit 110 may include a group identifier information storage unit 111, a group identifier determining unit 112, an index selecting unit 113, a group masking unit 114, a group masking information storage unit 115, a pool information storage unit 116, an operating unit 117 and a group pool information storage unit 118.

The group identifier information storage unit 111 may store the table TB_GID including information of the group identifier GID of FIG. 2. Based on the table TB_GID, the group identifier information storage unit 111 may output the start segment index SSGI and the end segment index ESGI corresponding to each group identifier GID.

In response to the memory allocation request MRQ, and by referring to the table TB_GID, the group identifier determining unit 112 may map the group identifier GID to the buffer identifier BID to be allocated to the processor, and may output, as a selected group identifier SGID, the group identifier GID mapped to the buffer identifier BID. In an embodiment, the memory allocation request MRQ may include the buffer identifier BID already allocated to the processor. Based on the buffer identifier BID included in the memory allocation request MRQ, the group identifier determining unit 112 may output the selected group identifier SGID mapped to the buffer identifier BID.

The index selecting unit 113 may receive, from the group identifier information storage unit 111, the start segment index SSGI and the end segment index ESGI corresponding to each of the group identifier GID 0 to the group identifier GID N. The index selecting unit 113 may receive the selected group identifier SGID from the group identifier determining unit 112. In response to the selected group identifier SGID, the index selecting unit 113 may output, as a selected start segment index SSSGI and a selected end segment index SESGI, the start segment index SSGI and the end segment index ESGI corresponding to the selected group identifier SGID.

For example, the index selecting unit 113 may include a first index selecting unit 1131 and a second index selecting unit 1132. The first index selecting unit 1131 may receive the start segment index SSGI corresponding to each of the group identifier GID 0 to the group identifier GID N. In response to the selected group identifier SGID, the first index selecting unit 1131 may output, as the selected start segment index SSSGI, the start segment index SSGI corresponding to the selected group identifier SGID. The second index selecting unit 1132 may receive the end segment index ESGI corresponding to each of the group identifier GID 0 to the group identifier GID N. In response to the selected group identifier SGID, the second index selecting unit 1132 may output, as the selected end segment index SESGI, the end segment index ESGI corresponding to the selected group identifier SGID.

The group masking unit 114 may generate group masking information GMASK based on the selected start segment index SSSGI and the selected end segment index SESGI. The group masking information GMASK may include a masking value corresponding to each of the segments within the memory device 200. The group masking unit 114 may mask, within the group masking information GMASK, the masking values corresponding to respective segments indicated by the selected start segment index SSSGI to the selected end segment index SESGI. Therefore, the group masking information GMASK may represent the segments to which the selected group identifier SGID is assigned from among all segments within the memory device 200. The masking value corresponding to a segment may represent whether the selected group identifier SGID is assigned to the corresponding segment. The masking value corresponding to a segment may represent whether the selected group identifier SGID is assigned to the segment group that includes the corresponding segment. Within the group masking information GMASK, the masking value that is masked may have a first value (e.g., a value of '1': marked with shading in FIG. 3) and remaining masking value that is not masked may have a second value (e.g., a value of '0' in unshaded segments).

The group masking information storage unit 115 may store the group masking information GMASK received from the group masking unit 114.

The pool information storage unit 116 may store pool information POOL. The pool information POOL may include a status value corresponding to each segment within the memory device 200. The status value corresponding to a segment may represent whether the corresponding segment is free. Within the pool information POOL, a status value corresponding to a free segment may have a first value and a status value corresponding to a segment mapped to the buffer identifier BID may have a second value. In an embodiment, a status value corresponding to a segment allocated to the processor may have the second value. The memory manager 100 may update, in real time, the status values stored in the pool information storage unit 116.

The operating unit 117 may perform a bitwise AND operation on the group masking information GMASK stored in the group masking information storage unit 115 and the pool information POOL stored in the pool information storage unit 116. As a result of the bitwise AND operation, the operating unit 117 may output the first value as a result value when both bits corresponding to the same segment have the first value within the group masking information GMASK and the pool information POOL. In remaining cases, the operating unit 117 may output the second value as the result value.

The group pool information storage unit 118 may store, as group pool information GPOOL, the output of the operating unit 117. The group pool information GPOOL may indicate the segments mappable to the buffer identifier BID and the segments unmappable to the buffer identifier BID. The group pool information GPOOL may include the result value corresponding to each of the segments within the memory device 200. The result value corresponding to a segment may represent whether it is possible or not possible to map the corresponding segment to the buffer identifier BID. In other words, the result value corresponding to a segment may represent whether the corresponding segment is a free segment to which the selected group identifier SGID is assigned. Within the group pool information GPOOL, the result value corresponding to the segment mappable to the buffer identifier BID may have the first value, while the result value corresponding to the segment unmappable to the buffer identifier BID may have the second value.

Figure 4:
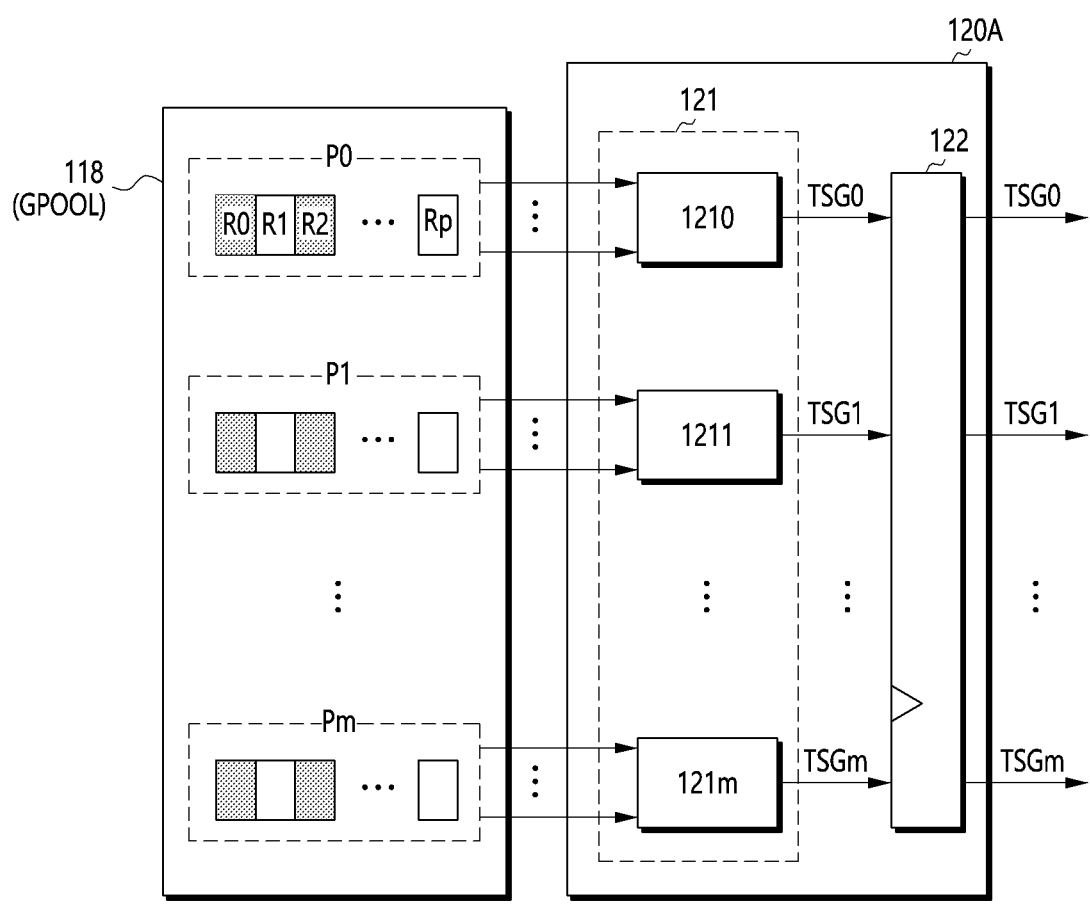
FIG. 4 is a diagram illustrating a segment allocating unit in accordance with an embodiment of the disclosure.

FIG. 4 is a diagram illustrating a segment allocating unit in accordance with an embodiment of the disclosure. A segment allocating unit 120A may be an example of a segment allocating unit 120 illustrated in FIG. 1.

Referring to FIG. 4, based on the group pool information GPOOL, the segment allocating unit 120A may select, from regions into which all segments are divided within the memory device 200, segments (hereinafter, referred to as target segments) to be mapped to the buffer identifier BID. The segment allocating unit 120A may allocate the target segments to the processor that provides the memory allocation request MRQ. Specifically, the segment allocating unit 120A may select the target segments based on group pool information pieces P0 to Pm that are internally divided within the group pool information GPOOL, and may output information of the respective target segments as target segment information TSG0 to TSGm.

The segment allocating unit 120A may include a selecting unit 121 and a register 122.

The selecting unit 121 may receive the group pool information pieces P0 to Pm from the group pool information GPOOL, may select the target segments based on the respective group pool information pieces P0 to Pm and may output the target segment information TSG0 to TSGm. The group pool information pieces P0 to Pm may correspond to respective regions into which all segments are divided within the memory device 200. During a single operation cycle (i.e., a unit amount of operation time), the selecting unit 121 may select at most a single target segment based on each of the group pool information pieces P0 to Pm.

Specifically, the selecting unit 121 may include sub-selecting units 1210 to 121*m*. The sub-selecting units 1210 to 121*m* may receive the group pool information pieces P0 to Pm to output the target segment information TSG0 to TSGm, respectively. The sub-selecting units 1210 to 121*m* may output the target segment information TSG0 to TSGm simultaneously. For example, during a single operation cycle, the sub-selecting units 1210 to 121*m* may output the target segment information TSG0 to TSGm simultaneously. During the single operation cycle, the sub-selecting units 1210 to 121*m* may output the target segment information TSG0 to TSGm in a parallel manner. As the operation cycle repeats, the sub-selecting units 1210 to 121*m* may output the target segment information TSG0 to TSGm consecutively. The register 122 may temporarily store the target segment information TSG0 to TSGm and may output the stored target segment information TSG0 to TSGm.

Specifically, each of the sub-selecting units 1210 to 121*m* may identify, as the segments mappable to the buffer identifier BID, segments corresponding to the first value as the result value within a corresponding group pool information piece provided thereto. Each of the sub-selecting units 1210 to 121*m* may select, according to a predetermined condition, the target segments from among the identified segments mappable to the buffer identifier BID. For example, the predetermined condition may be that the target segments may be segments having earlier segment indexes SGI from among the identified segments mappable to the buffer identifier BID, but this example does not limit embodiments of the scope of the present disclosure.

For example, the sub-selecting unit 1210 may receive the group pool information piece P0 and may refer to the respective result values R0 to Rp within the group pool information piece P0. The sub-selecting unit 1210 may determine a first segment, which corresponds to the first value (marked shading in FIG. 4) as the result value R0, as mappable to the buffer identifier BID and may output, during the first operation cycle, the target segment information TSG0 representing the first segment. Then, the sub-selecting unit 1210 may determine a third segment, which corresponds to the first value as the result value R2 (marked shading in FIG. 4), as mappable to the buffer identifier BID and may output, during the second operation cycle, the target segment information TSG0 representing the third segment. The sub-selecting unit 1210 may determine a second segment, which corresponds to the second value as the result value R1, as unmappable to the buffer identifier BID. Each of the remaining sub-selecting units 1211 to 121*m* may operate in a manner similar to the operation of the sub-selecting unit 1210 described above.

In an embodiment, each of the sub-selecting units 1210 to 121*m* may be set to be activated or deactivated. Accordingly, by adjusting the number of activated sub-selecting units selected from the sub-selecting units 1210 to 121*m*, the number of segments to be allocated to the processor is also adjusted.

In an embodiment, a group pool information piece may include only the second value without the first value. For example, all segments corresponding to the group pool information piece may be regarded as unmappable to the buffer identifier BID. In this case, the corresponding sub-selecting unit may determine, by referring to the group pool information piece, all segments corresponding to the group pool information piece as unmappable to the buffer identifier BID and may output the corresponding target segment information, which represents no segments that can be mapped. In other words, the corresponding sub-selecting unit may not select the target segment.

It may become difficult to support the dynamic allocation of segments as the number of segments increases within the memory device 200. In accordance with an embodiment, the whole memory region within the memory device 200 may be divided into a plurality of regions respectively corresponding to the group pool information pieces P0 to Pm. The sub-selecting units 1210 to 121*m* may allocate, according to the predetermined condition, the target segments from the respective regions in a parallel manner. Accordingly, delay or latency may be reduced for the allocation, and throughput may be increased.

Figure 5:
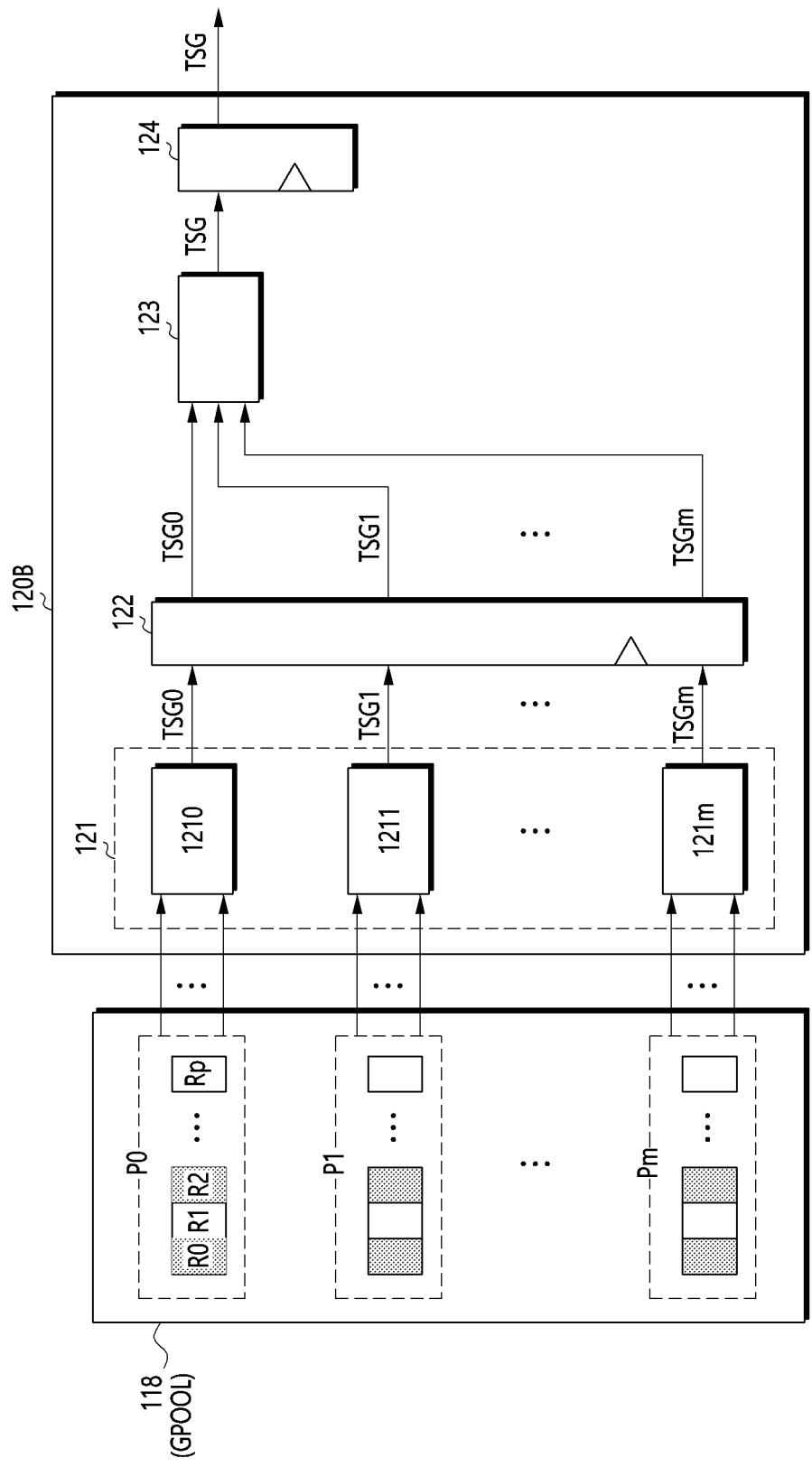
FIG. 5 is a diagram illustrating a segment allocating unit in accordance with an embodiment of the disclosure.

FIG. 5 is a diagram illustrating a segment allocating unit in accordance with an embodiment of the disclosure. A segment allocating unit 120B may be an example of a segment allocating unit 120 illustrated in FIG. 1.

Referring to FIG. 5, the segment allocating unit 120B may further include an additional selecting unit 123 and an additional register 124 when compared with the segment allocating unit 120A of FIG. 4. The selecting unit 121 and the register 122 included in the segment allocating unit 120B illustrated in FIG. 5 may have the same structure and perform the same operation respectively as the selecting unit 121 and the register 122 included in the segment allocating unit 120A illustrated in FIG. 4.

The additional selecting unit 123 may receive the target segment information TSG0 to TSGm from the register 122 and may select, according to a prioritized selecting condition that is predetermined, one of the target segment information TSG0 to TSGm. The additional selecting unit 123 may output the selected target segment information as prioritized segment information TSG. For example, the prioritized selecting condition may be that the prioritized segment information TSG is selected to correspond only to a single and particular one of the group pool information pieces P0 to Pm. In other words, the prioritized selecting condition may prioritize segment information TSG as the target segment information from one of the sub-selecting units 1210 to 121*m*.

For example, the additional selecting unit 123 may output, as the prioritized segment information TSG, the target segment information TSG1 selected from the group pool information piece P1. The additional register 124 may temporarily store therein the prioritized segment information TSG from the additional selecting unit 123 and may output the stored prioritized segment information TSG.

In an embodiment, each of the additional selecting unit 123 and the additional register 124 may be set to be activated or deactivated. When the additional selecting unit 123 and the additional register 124 become deactivated, the segment allocating unit 120B may determine the target segments based on the target segment information TSG0 to TSGm from the register 122.

Figure 6A:
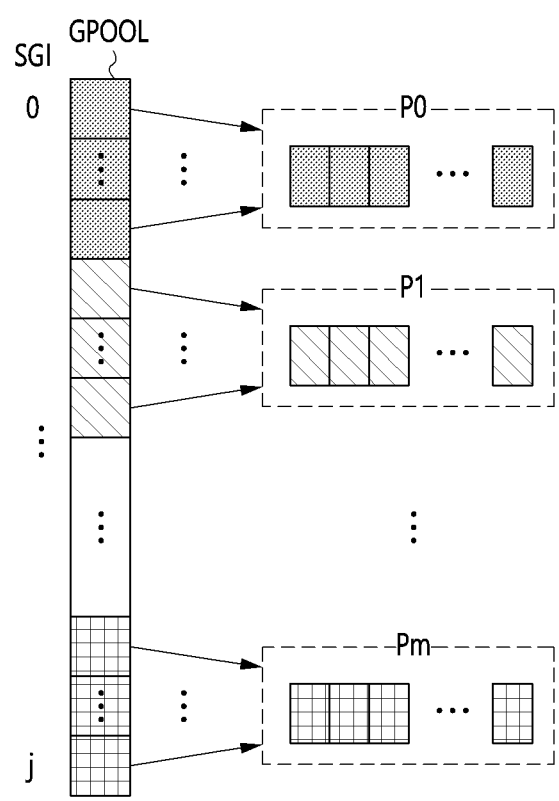
FIGS. 6A and 6B are diagrams illustrating an operation of dividing group pool information into a plurality of group pool information pieces in accordance with an embodiment of the disclosure.
Figure 6B:
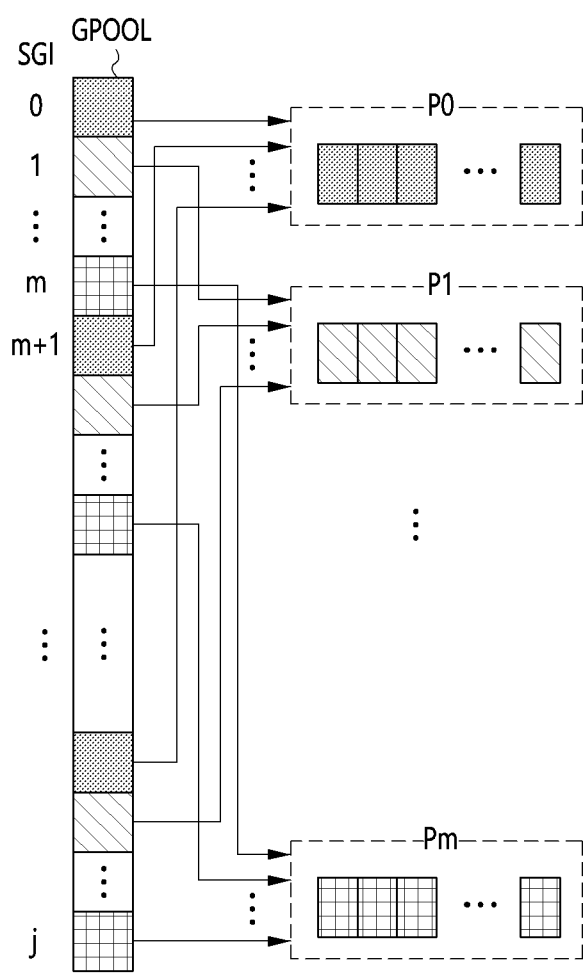

FIGS. 6A and 6B are diagrams illustrating an operation of dividing group pool information into a plurality of group pool information pieces in accordance with an embodiment of the disclosure.

Referring to FIG. 6A, result values included in a group pool information GPOOL may sequentially correspond to a respective segment index SGI 0 to a segment index SGI j, as described above. The group pool information GPOOL may be divided into group pool information pieces P0 to Pm. The size of the group pool information pieces P0 to Pm may be the same as one another. Each of the group pool information pieces P0 to Pm may include the result values corresponding to the continuous segment indexes SGI. For example, the group pool information piece P0 may include the result values respectively corresponding to the segment index SGI 0 to the segment index SGI 99, and the group pool information piece P1 may include the result values respectively corresponding to the segment index SGI 100 to the segment index SGI 199.

Referring to FIG. 6B, each of the group pool information pieces P0 to Pm may include result values respectively corresponding to the segment indexes SGI that are not sequential. For example, one group pool information piece may include result values that are separated in the index by a predetermined value, which is different from the embodiment of FIG. 6A. For example, the group pool information piece P0 may include the result values respectively corresponding to the segment indexes SGI (e.g., segment index SGI 0, segment index SGI m+1, segment index SGI 2m+2 and so forth), e.g., where two result values have an index difference by a value of 'm+1'. The embodiments of FIGS. 6A and 6B are just examples and the group pool information GPOOL may be divided into the group pool information pieces P0 to Pm in various manners.

The scheme of dividing the group pool information GPOOL into the group pool information pieces P0 to Pm may be determined and fixed at the fabrication stage of the memory system 1. In some embodiments, the scheme of dividing the group pool information GPOOL into the group pool information pieces P0 to Pm may change during the operation of the memory system 1.

Figure 7:
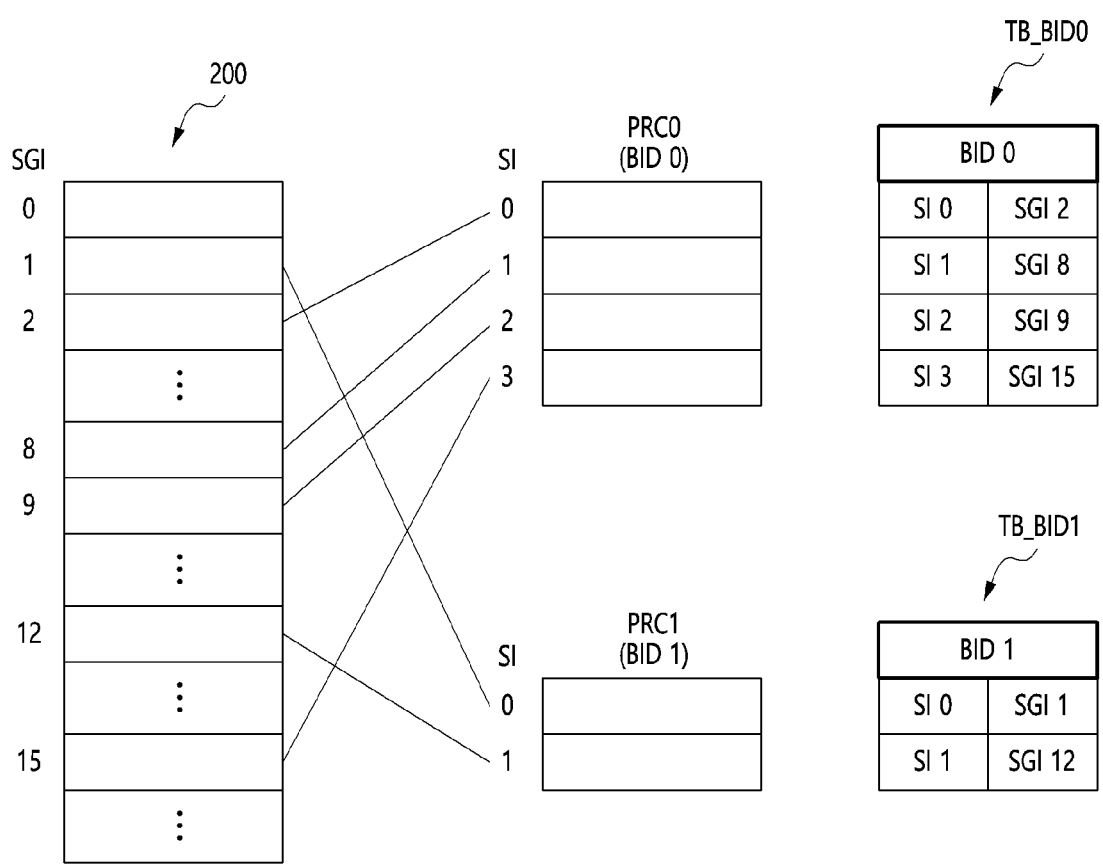
FIG. 7 is a diagram illustrating a slot index in accordance with an embodiment of the disclosure.

FIG. 7 is a diagram illustrating a slot index SI in accordance with an embodiment of the disclosure.

Referring to FIG. 7, in response to a request from a processor PRC0, a memory manager 100 may allocate, to the processor PRC0, a buffer identifier BID 0 and segments of discontinuous segment indexes SGI 2, 8, 9 and 15. The memory manager 100 may assign, to continuous slot index SI 0 to slot index SI 3, segments of discontinuous segment indexes SGI 2, 8, 9 and 15, respectively. The segment index SGI may be a physical address and the slot index SI may be a virtual address. For example, the memory manager 100 may manage the table TB_BID0 having the mapping relationship between the slot index SI and the segment index SGI, when the table TB_BID0 is assigned to the buffer identifier BID 0. For example, the table TB_BID0 may be included in the segment mapping information AI corresponding to the buffer identifier BID 0, as illustrated in FIG. 2.

Based on the buffer identifier BID 0 and the slot indexes SI, the processor PRC0 may access the allocated segment. For example, the processor PRC0 may provide the memory manager 100 with an access request including the buffer identifier BID 0 and the slot index SI 1. In response to the access request, the memory manager 100 may refer to the table TB_BID0, which is assigned to the buffer identifier BID 0, to identify the segment index SGI 8 mapped to the slot index SI 1, thereby accessing the segment of the segment index SGI 8. The processor PRC0 may access the memory device 200 more effectively when utilizing the continuous slot indexes SI than when utilizing discontinuous slot indexes SI. Even when discontinuous and sporadic segments are allocated to the processor PRC0 from the memory device 200, the processor PRC0 may linearly access the segments by utilizing the continuous slot indexes SI.

In a similar manner, the memory manager 100 may allocate, to the processor PRC1, the buffer identifier BID 1 and segments of the segment index SGI 1 and the segment index SGI 12, which are discontinuous. The memory manager 100 may assign the slot index SI 0 and the slot index SI 1, which are continuous, to the segments of the segment index SGI 1 and the segment index SGI 12. For example, the memory manager 100 may manage the table TB_BID1 having the mapping relationship between the slot index SI and the segment index SGI, when the table TB_BID1 being assigned to the buffer identifier BID 1. In a similar manner to the processor PRC0, the processor PRC1 may access the allocated segment based on the buffer identifier BID 1 and the slot indexes SI.

When segments within the single memory device 200 are repeatedly allocated to and released from the plurality of processors PRC0 to PRCk, there may occur segmentation of the memory device 200 and it may become difficult to linearly access the memory device 200, which may cause performance degradation in the memory system 1. In accordance with embodiments of the disclosure, each processor may linearly access the memory device 200 by utilizing the continuous slot indexes SI despite the segmentation of the memory device 200, which may preserve the high performance of the memory system 1.

Figure 8:
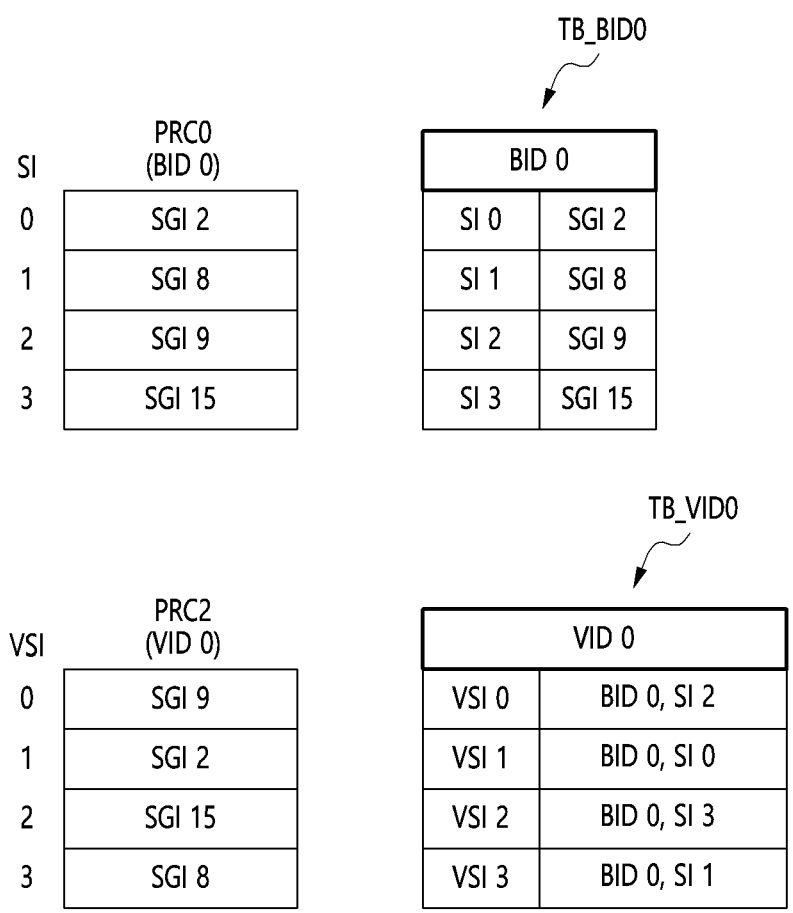
FIG. 8 is a diagram illustrating a virtual buffer identifier in accordance with an embodiment of the disclosure.

FIG. 8 is a diagram illustrating a virtual buffer identifier in accordance with an embodiment of the disclosure.

Referring to FIG. 8, a buffer identifier BID 0 and segments of the segment indexes SGI 2, 8, 9 and 15 may be allocated to the processor PRC0. As described with reference to FIG. 7, the processor PRC0 may access the allocated segments based on the slot index SI 0 to slot index SI 3. In an example, the processor PRC2 may need to access the segments of the segment indexes SGI 2, 8, 9 and 15 according to a different access sequence from the processor PRC0 in order for the processor PRC2 to perform another operation related to the operation of the processor PRC0. For instance, the processor PRC0 may need to store externally provided data into the memory device 200 according to a first sequence and the processor PRC2 may need to store the data, which is stored in the memory device 200, into the storage medium 20 according to a second sequence different from the first sequence. The first sequence may involve data that is externally provided, a sequence of logical addresses, and so forth. The second sequence may be one of a sequence of channels, a sequence of physical addresses and so forth.

In order to perform the operation related to the operation of the processor PRC0, the processor PRC2 may provide the memory manager 100 with a request for assigning a virtual buffer identifier VID. In an embodiment, the processor PRC0 may provide the memory manager 100 with the request for assigning the virtual buffer identifier VID to the processor PRC2 while requesting the processor PRC2 to perform the operation related to the operation of the processor PRC0. In response to the request for assigning the virtual buffer identifier VID to the processor PRC2, the memory manager 100 may assign the virtual buffer identifier VID 0 to the processor PRC2. The memory manager 100 may re-arrange the segments of the segment indexes SGI 2, 8, 9 and 15, may map the virtual buffer identifier VID 0 to the re-arranged segments, and may sequentially assign the continuous virtual slot indexes VSI 0 to VSI 3 to the re-arranged segments. For example, the sequence of the segment indexes SGI 2, 8, 9 and 15 may be re-arranged to the sequence of the segment indexes SGI 9, 2, 15 and 8.

The memory manager 100 may manage a table TB_VID0 assigned to the virtual buffer identifier VID 0. The table TB_VID0 may include the buffer identifier BID and the slot index SI both mapped to each of the virtual slot indexes VSI assigned to the virtual buffer identifier VID 0. When a segment mapped to the buffer identifier BID 0 changes, the memory manager 100 may update the table TB_BID0 assigned to the buffer identifier BID 0 and may not update the table TB_VID0 assigned to the virtual buffer identifier VID 0.

Therefore, based on the virtual buffer identifier VID 0 and the virtual slot indexes VSI, the processor PRC2 may access the segments allocated to the processor PRC0. For example, the processor PRC2 may provide the memory manager 100 with an access request including the virtual buffer identifier VID 0 and the virtual slot index VSI 0. In response to the access request, the memory manager 100 may refer to the table TB_VID0 to identify the buffer identifier BID 0 and the slot index SI 2, both mapped to the virtual slot index VSI 0, with the table TB_VID0 being assigned to the virtual buffer identifier VID 0. Accordingly, the memory manager 100 may refer to the table TB_BID0 to identify the segment index SGI 9 mapped to the slot index SI 2. The table TB_BID0 is assigned to the buffer identifier BID 0, and so the segment index SGI 9 is accessed.

The virtual buffer identifier VID 0 may be assigned to the processor PRC2 and, by utilizing the continuous virtual slot indexes VSI, the processor PRC2 may effectively access the segments that are re-arranged in a difference sequence from the sequence for the processor PRC0. Although the segments may be accessed according to different sequences between the processor PRC0 and the processor PRC2 in order for the processor PRC0 and the processor PRC2 to perform different operations, each of the processor PRC0 and the processor PRC2 may linearly access the segments.

Figure 9:
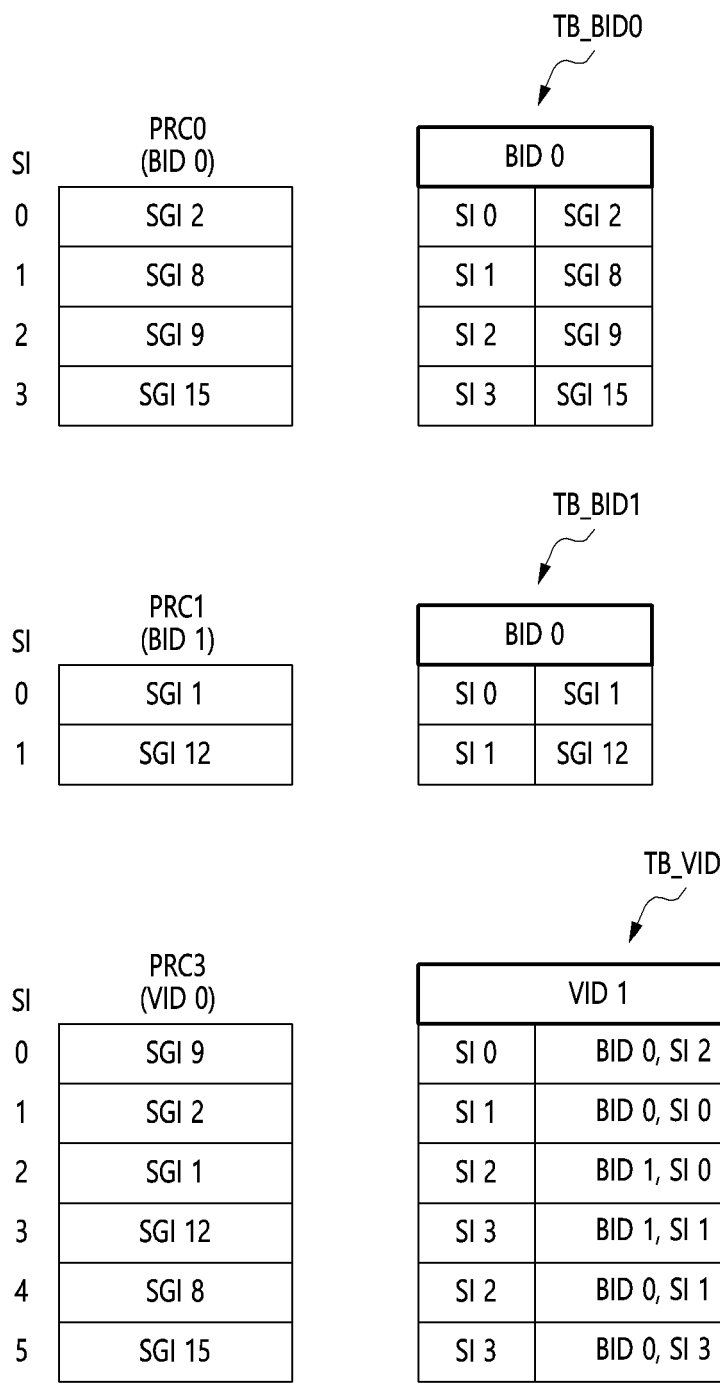
FIG. 9 is a diagram illustrating a virtual buffer identifier in accordance with an embodiment of the disclosure.

FIG. 9 is a diagram illustrating a virtual buffer identifier in accordance with an embodiment of the disclosure.

Referring to FIG. 9, in an embodiment, a single virtual buffer identifier VID may be mapped to two or more buffer identifiers BID.

For example, a memory manager 100 may re-arrange the segments of segment indexes SGI 1, 2, 8, 9, 12 and 15 assigned to both the buffer identifier BID 0 and the buffer identifier BID 1, may map the re-arranged segments to the virtual buffer identifier VID 1, may sequentially assign the virtual slot index VSI 0 to the virtual slot index VSI 5 to the re-arranged segments, and may allocate the virtual buffer identifier VID 1 to the processor PRC3. The memory manager 100 may manage the table TB_VID1 assigned to the virtual buffer identifier VID 1. The table TB_VID1 may include the buffer identifier BID and the slot index SI, both mapped to each of the virtual slot indexes VSI assigned to the virtual buffer identifier VID 1. Therefore, based on the virtual buffer identifier VID 1 and virtual slot indexes VSI, the processor PRC3 may linearly access the segments, which are allocated to the processors PRC0 and PRC1, in a different sequence from the sequences for the processors PRC0 and PRC1.

In accordance with an embodiment, a memory controller may effectively perform dynamic memory allocation and release.

While certain embodiments have been described above, it will be understood to those skilled in the art that the embodiments described are only examples. Accordingly, the memory controller should not be limited based on the described embodiments. Rather, the memory controller described herein should only be limited in light of the claims that follow when taken in conjunction with the above description and accompanying drawings.

What is claimed is:

1. A memory controller comprising:
    a plurality of processors;
    a memory device including a plurality of segments, which are divided into a plurality of segment groups, to which group identifiers are respectively assigned; and
    a memory manager configured to:
    map a first buffer identifier to a first group identifier from among the group identifiers,
    select one or more segments only from a first segment group, to which the first group identifier is assigned among the plurality of segment groups, within a maximum allocation count corresponding to the first group identifier,
    map the first buffer identifier to the one or more segments, and
    allocate, to a first processor from among the plurality of processors, the first buffer identifier and the one or more segments.

2. The memory controller of claim 1, wherein the memory manager is configured to:
    manage maximum allocation counts respectively corresponding to the group identifiers.

3. The memory controller of claim 1, wherein the memory manager is configured to select, when the first buffer identifier is mapped to the first group identifier, the one or more segments not from a segment group other than the first segment group among the plurality of segment groups.

4. The memory controller of claim 1, wherein each of the group identifiers is mapped to one or more buffer identifiers.

5. The memory controller of claim 1, wherein each of the segment groups includes segments of continuous segment indexes.

6. The memory controller of claim 1,
    wherein the memory manager is configured to assign continuous slot indexes to the one or more segments, and
    wherein the first processor is configured to access the one or more segments based on the first buffer identifier and the slot indexes.

7. The memory controller of claim 1,
    wherein the memory manager includes sub-selecting units configured to select, in a parallel manner and from regions into which the plurality of segments is divided, the one or more segments to be mapped to the first buffer identifier, and
    wherein each of the sub-selecting units is configured to:
    identify segments, which are free and included in the first segment group, and
    select, from among the identified segments, a segment to be mapped to the first buffer identifier.

8. The memory controller of claim 7, wherein each of the sub-selecting units is configured to select, during a single operation cycle, at most a single segment from the corresponding region such that the sub-selecting units select the one or more segments in parallel while the operation cycle repeats.

9. The memory controller of claim 7, wherein the memory manager includes:
    a group masking unit configured to generate, based on a start segment index and an end segment index corresponding to the first group identifier, group masking information including masking values respectively corresponding to the plurality of segments, each of the masking values representing whether corresponding segment of the plurality of segments is included in the first segment group;
    a pool information storage unit configured to store therein pool information including status values respectively corresponding to the plurality of segments, each of the status values representing whether corresponding segment of the plurality of segments is free; and
    an operating unit configured to generate, based on the group masking information and the pool information, group pool information including result values respectively corresponding to the plurality of segments, each of the result values representing whether corresponding segment of the plurality of segments is free and included in the first segment group.

10. The memory controller of claim 9,
wherein the group pool information is divided into group pool information pieces respectively corresponding to the regions,
wherein the sub-selecting units are configured to receive the group pool information pieces, respectively, and
wherein each of the sub-selecting units is configured to identify, based on the correspondingly received one of the group pool information pieces, the segments that are free and included in the first segment group.

11. A memory controller comprising:
a memory device including segments, which are divided into regions; and
a memory manager including:
a group pool determining unit configured to generate group pool information representing segments mappable to a buffer identifier, the group pool information being divided into group pool information pieces respectively corresponding to the regions; and
sub-selecting units configured to receive the respective group pool information pieces and select, in parallel, from the respective regions, segments to be mapped to the buffer identifier based on the respective group pool information pieces.

12. The memory controller of claim 11,
wherein each of the sub-selecting units is configured to select, during a single operation cycle and based on the correspondingly received one of the group pool information pieces, at most a single segment to be mapped to the buffer identifier.

13. The memory controller of claim 12, wherein the sub-selecting units are configured to select the segments to be mapped to the buffer identifier in a parallel manner while the operation cycle repeats.

14. The memory controller of claim 12,
wherein the memory manager is configured to allocate the buffer identifier to a processor and map the buffer identifier to a group identifier, and
wherein the group pool determining unit is configured to determine, as the segments mappable to the buffer identifier, segments that are free and included in a segment group to which the group identifier is assigned.

15. A memory controller comprising:
a plurality of processors;
a memory device including a plurality of segments, to which segment indexes are respectively assigned; and
a memory manager configured to:
re-arrange segments, to which one or more buffer identifiers are mapped,
map a virtual buffer identifier to the re-arranged segments,
assign continuous virtual slot indexes to the re-arranged segments, and
allocate the virtual buffer identifier to a first processor among the plurality of processors,
wherein the first processor is configured to access the re-arranged segments based on the virtual buffer identifier and the virtual slot indexes.

16. The memory controller of claim 15,
wherein the memory manager is configured to:
map a buffer identifier to one or more segments,
allocate the buffer identifier and the one or more segments to a second processor among the plurality of processors, and
assign continuous slot indexes to the one or more segments, and
wherein the second processor is configured to access the one or more segments based on the buffer identifier and the slot indexes.

17. The memory controller of claim 16, wherein the memory manager is configured to manage a table corresponding to the buffer identifier, the table including a segment index mapped to each of the slot indexes.

18. The memory controller of claim 17, wherein the memory manager is configured to:
receive, from the second processor, an access request including the buffer identifier and a slot index,
refer to the table corresponding to the buffer identifier to identify a segment index mapped to the slot index, and
access a segment, to which the segment index is assigned.

19. The memory controller of claim 15, wherein the memory manager is configured to manage a table corresponding to the virtual buffer identifier, the table including a buffer identifier and a slot index both mapped to each of the virtual slot indexes.

20. The memory controller of claim 19, wherein the memory manager is configured to:
receive, from the first processor, an access request including the virtual buffer identifier and a virtual slot index,
refer to the table corresponding to the virtual buffer identifier to identify a buffer identifier and a slot index both mapped to the virtual slot index,
refer to a table corresponding to the identified buffer identifier to identify a segment index mapped to the identified slot index, and
access a segment, to which the segment index is assigned.

* * * * *